(12) United States Patent
Nádas et al.

(10) Patent No.: US 12,369,068 B2
(45) Date of Patent: Jul. 22, 2025

(54) DIMENSIONING GRANULAR MULTI-TIMESCALE FAIRNESS

(71) Applicant: Telefonaktiebolaget LM Ericsson (publ), Stockholm (SE)

(72) Inventors: Szilveszter Nádas, Budapest (HU); Balázs Varga, Budapest (HU); Miklos Telek, Budapest (HU); András Mészáros, Budapest (HU); Illés Antal Horváth, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 510 days.

(21) Appl. No.: 17/797,354

(22) PCT Filed: Oct. 28, 2020

(86) PCT No.: PCT/IB2020/060100
§ 371 (c)(1),
(2) Date: Aug. 3, 2022

(87) PCT Pub. No.: WO2021/186234
PCT Pub. Date: Sep. 23, 2021

(65) Prior Publication Data
US 2023/0056482 A1    Feb. 23, 2023

Related U.S. Application Data

(60) Provisional application No. 62/991,836, filed on Mar. 19, 2020.

(51) Int. Cl.
*H04W 28/02*    (2009.01)
*H04L 47/22*    (2022.01)
(Continued)

(52) U.S. Cl.
CPC ....... *H04W 28/0247* (2013.01); *H04L 47/225* (2013.01); *H04L 47/28* (2013.01); *H04W 28/20* (2013.01)

(58) Field of Classification Search
CPC .............. H04W 28/0247; H04W 28/20; H04L 47/225; H04L 47/28; H04L 47/522
See application file for complete search history.

(56) References Cited

U.S. PATENT DOCUMENTS

| 11,019,126 B2 | 5/2021 | Sridhar et al. |
| 2007/0153682 A1 | 7/2007 | Swenson et al. |

(Continued)

FOREIGN PATENT DOCUMENTS

| WO | 2014189422 A1 | 11/2014 |
| WO | 2018086713 A1 | 5/2018 |

(Continued)

OTHER PUBLICATIONS

Szilveszter Nadas, Multi timescale bandwidth profile and its application for burst-aware fairness, Mar. 19, 2019, arXiv: 1903.08075v1, [retrieved on Feb. 20, 2025], retrieved from the Internet: <URL: https://arxiv.org/pdf/1903.08075> (Year: 2019).*

(Continued)

*Primary Examiner* — Charles C Jiang
*Assistant Examiner* — Rachel Elizabeth Marks
(74) *Attorney, Agent, or Firm* — COATS & BENNETT, PLLC

(57) ABSTRACT

A boost is provided in an overloaded system by distinguishing nodes with a "bad" traffic history from nodes with a "good" traffic history. In so doing, a core network node is able to apply additional resources to the node(s) having a "good" history in the form of a boost factor. Based on a system capacity and a working point, e.g., a critical number of active nodes with a "bad" traffic history, the core network (Continued)

node may determine a throughput history limit belonging to the "bad" traffic history. Responsive to expected requirements for a newly active node (i.e., a node having a "good" traffic history), the core network node determines a boost factor for the newly active node, applies the boost factor to the average resources allocated to the nodes with the "bad" traffic history to determine boosted resources, and allocates the boosted resources to the newly active node.

20 Claims, 10 Drawing Sheets

(51) Int. Cl.
*H04L 47/28* (2022.01)
*H04W 28/20* (2009.01)

(56) References Cited

U.S. PATENT DOCUMENTS

| | | | |
|---|---|---|---|
| 2015/0074285 A1* | 3/2015 | Gahm | H04L 65/75 |
| | | | 709/231 |
| 2015/0088965 A1 | 3/2015 | Pakulski et al. | |
| 2016/0072691 A1* | 3/2016 | Xu | H04B 7/18578 |
| | | | 370/252 |
| 2016/0205164 A1 | 7/2016 | Schmidt et al. | |
| 2020/0067852 A1 | 2/2020 | Sen et al. | |
| 2021/0288942 A1 | 9/2021 | Preda et al. | |

FOREIGN PATENT DOCUMENTS

| | | | |
|---|---|---|---|
| WO | 2018112657 | A1 | 6/2018 |
| WO | 2019096370 | A1 | 5/2019 |
| WO | 2019141380 | A1 | 7/2019 |
| WO | 2019217530 | A1 | 11/2019 |
| WO | 2020074125 | A1 | 4/2020 |
| WO | 2020229905 | A1 | 11/2020 |

OTHER PUBLICATIONS

Szilveszter Nadas, Towards Core-Stateless Fairness on Multiple Timescales, Jul. 22, 2019, [retrieved on Feb. 20, 2025], retrieved from the Internet: <URL: https://dl.acm.org/doi/pdf/10.1145/3340301.3341124> (Year: 2019).*

Allalouf, M. et al., "A Simulation Study of Multi-Color Marking of TCP Aggregates", 32nd IEEE Conference on Local Computer Networks, Oct. 15, 2007, pp. 376-383, IEEE.

Heinanen, J. et al., "A Two Rate Three Color Marker", Network Working Group, Sep. 1, 1999, pp. 1-6, RFC 2698, The Internet Society.

Nádas, S. et al., "Multi timescale bandwidth profile and its application for burst-aware fairness", Mar. 28, 2019, pp. 1-23, Ericsson.

Nádas, S. et al., "Towards Core-Stateless Fairness on Multiple Timescales", Applied Networking Research Workshop 2019 (ANRW '19), Jul. 22, 2019, pp. 30-36, ACM.

Nádas, S. et al., "Multi time-scale fairness for heterogeneous broadband traffic in access-aggregation network", European Workshop on Performance Engineering—International Conference on Analytical and Stochastic Modeling Techniques and Applications, Nov. 27, 2021, pp. 62-78, Springer.

Metro Ethernet Forum, "Ethernet Services Attributes Phase 2", MEF Technical Specification, Version MEF 10.2, Oct. 27, 2009, pp. 1-65, MEF.

Nádas, S. et al., "Bandwidth profile for multi-timescale fairness", 2020 IEEE Wireless Communications and Networking Conference (WCNC), May 25, 2020, pp. 1-8, IEEE.

Nádas, S. et al., "Per Packet Value: A Practical Concept for Network Resource Sharing", 2016 IEEE Global Communications Conference (GLOBECOM), Dec. 4, 2016, pp. 1-7, IEEE.

Nádas, S et al., "Towards a Congestion Control-Independent Core-Stateless AQM", ANRW '18: Proceedings of the Applied Networking Research Workshop, Jul. 16, 2018, pp. 84-90, Association for Computing Machinery.

* cited by examiner

DIMENSIONING GRANULAR
MULTI-TIMESCALE FAIRNESS

RELATED APPLICATIONS

This application claims priority to U.S. Application No. 62/991,836, filed 19 Mar. 2020, disclosure of which is incorporated in its entirety by reference herein.

BACKGROUND

Communication networks, both wireless and wired, share resources with multiple devices to convey traffic flows from a network source, e.g., a server, to a remote device, e.g., a user device. To that end, the communication networks implement some type of "fairness" for sharing those resources. Fairness is often defined in terms of equal throughput for all traffic flows. However, such equal throughput applications do not properly account for bursty situations that regularly occur in communication networks, particularly communication networks that have a bottleneck. Consider the following analogy involving an intersection of a busy street with a side street. If traffic is allowed to flow unimpeded along the busy street, the large volume of cars on the busy street have equal throughput through that intersection. However, the infrequent approach of a car on the side street may result in that car being unable to cross. In this example, the vast majority of cars may have equal throughput through that intersection over a particular timescale, e.g., a short timescale. However, when a longer timescale is considered, it becomes clear that not all traffic scenarios are being treated fairly. The same is true for the communication of traffic flows through a bottleneck of a communication network. Thus, there remains a need for improving the fairness of sharing resources in such communication networks.

SUMMARY

The solution presented herein provides a boost to network nodes having a "good" traffic history in an overloaded system. More particularly, the solution presented herein distinguishes nodes with a "bad" traffic history (i.e., nodes consistently requiring resources over a long period of time) from nodes with a "good" traffic history (i.e., nodes intermittently or only briefly requiring resources). In so doing, the solution presented herein enables the core network node to apply additional resources to the node(s) having a "good" history in the form of a boost factor. Based on a system capacity and a working point, e.g., a critical number of active nodes with a "bad" traffic history, the core network node may determine a throughput history limit belonging to the "bad" traffic history. Responsive to expected requirements for a newly active node (i.e., a node having a "good" traffic history), the core network node determines a boost factor for the newly active node, applies the boost factor to the average resources allocated to the nodes with the "bad" traffic history to determine boosted resources, and allocates the boosted resources to the newly active node. As explained in further detail below, by allocating boosted resources to newly active nodes, the solution presented herein controls resource sharing for all traffic mixes, maintains the desired multi-timescale behavior for a wide range of traffic mixes, provides a basis for defining and discussing granular multi-timescale fairness, enables extension of fairness solutions to more requirements at the same time, enables a single Multi-TimeScale Throughput Value Function (MTS-TVF) to be applicable for heavy and light users without requiring any feedback, extends the advantages of the Per Packet Value (PPV) resource sharing framework to MTS (e.g., several service classes may be defined), and/or provides a net neutral way to improve Quality of Experience (QoE).

One exemplary embodiment comprises a method, implemented in a core network node, of adjusting resource allocation to provide multi-timescale fairness for a communication network at a bottleneck defining shared resource availability for a plurality of first nodes, each consistently requiring an average communication resource over a first time period, and a second node intermittently requiring communication resources during the first time period. The method comprises determining a boost factor responsive to the average communication resource and a planned data size for download by the second node during an initial boost time of a second time period within the first time period. The method further comprises applying the boost factor to the average communication resource to determine a boosted communication resource. The method further comprises allocating the boosted communication resource to the second node to configure the second node to download data using the boosted communication resource during the initial boost time of the second time period.

In some exemplary embodiments, the communication resource comprises a bandwidth.

Some exemplary embodiments further comprise allocating the average communication resource to the second node to configure the second node to download data using the average communication resource during a remainder of the second time period after expiration of the initial boost time.

Some exemplary embodiments further comprise determining a second boost factor for a second boost time of the second time period after expiration of the initial boost time responsive to the average communication resource and a second planned data size for download by the second node during the second boost time; applying the second boost factor to the average communication resource to determine a second boosted communication resource; and allocating the second boosted communication resource to the second node to configure the second node to download data using the second boosted communication resource during the second boost time of the second time period.

In some exemplary embodiments, a total load of the second node relative to a common link communication resource summed with a product of the average communication resource and the number of the plurality of first nodes is less than the common link communication resource.

Some exemplary embodiments further comprise allocating a communication resource to each of the plurality of first nodes and allocating the boosted communication resource to the second node according to a Multi-TimeScale Throughput Value Function (MTS-TVF) comprising a TVF for each of two or more different timescales. In some exemplary embodiments, each of the TVFs of the MTS-TVF further comprise a different TVF for each of one or more service classes. In some exemplary embodiments, the allocating the communication resource to each of the plurality of first nodes comprises allocating the communication resource to each of the plurality of first nodes responsive to one or more quality of experience requirements.

In some exemplary embodiments, the core network node comprises a gateway node.

In some exemplary embodiments, the plurality of first nodes and the second node each comprise different communication devices in the communication network.

One exemplary embodiment comprises a core network node configured to adjust resource allocation for a plurality of first nodes, each consistently requiring an average communication resource over a first time period, and a second node intermittently requiring communication resources during the first time period, to provide multi-timescale fairness for a communication network at a bottleneck defining shared resource availability for the plurality of first nodes and the second node. The core network node comprises one or more processing circuits configured to determine a boost factor responsive to the average communication resource and a planned data size for download by the second node during an initial boost time of a second time period within the first time period. The one or more processing circuits are further configured to apply the boost factor to the average communication resource to determine a boosted communication resource. The one or more processing circuits are further configured to allocate the boosted communication resource to the second node to configure the second node to download data using the boosted communication resource during the initial boost time of the second time period. In some exemplary embodiments, the communication resource comprises a bandwidth.

One exemplary embodiment comprises a computer program product for controlling a core network node in a communication network comprising a plurality of first nodes, each consistently requiring an average communication resource over a first time period, and a second node intermittently requiring communication resources during the first time period. The computer program product comprises software instructions which, when run on at least one processing circuit in the core network node, causes the core network node to determine a boost factor responsive to the average communication resource and a planned data size for download by the second node during an initial boost time of a second time period within the first time period. The software instructions, when run on the at least one processing circuit, further causes the core network node to apply the boost factor to the average communication resource to determine a boosted communication resource. The software instructions, when run on the at least one processing circuit, further causes the core network node to allocate the boosted communication resource to the second node to configure the second node to download data using the boosted communication resource during the initial boost time of the second time period. In some exemplary embodiments, the communication resource comprises a bandwidth.

Some exemplary embodiments further comprise a computer readable medium comprising the computer program product. In some exemplary embodiments, the computer readable medium comprises a non-transitory computer readable medium.

One exemplary embodiment comprises a core network node configured to adjust resource allocation for a plurality of first nodes, each consistently requiring an average communication resource over a first time period, and a second node intermittently requiring communication resources during the first time period, to provide multi-timescale fairness for a communication network at a bottleneck defining shared resource availability for the plurality of first nodes and the second node. The core network node comprises a boost circuit, and an allocation circuit. The boost circuit is configured to determine a boost factor responsive to the average communication resource and a planned data size for download by the second node during an initial boost time of a second time period within the first time period. The boost circuit is further configured to apply the boost factor to the average communication resource to determine a boosted communication resource. The allocation circuit is configured to allocate the boosted communication resource to the second node to configure the second node to download data using the boosted communication resource during the initial boost time of the second time period.

In some exemplary embodiments, the communication resource comprises a bandwidth.

In some exemplary embodiments, the allocation circuit is further configured to allocate the average communication resource to the second node to configure the second node to download data using the average communication resource during a remainder of the second time period after expiration of the initial boost time.

In some exemplary embodiments, the boost circuit is further configured to determine a second boost factor for a second boost time of the second time period after expiration of the initial boost time responsive to the average communication resource and a second planned data size for download by the second node during the second boost time; and apply the second boost factor to the average communication resource to determine a second boosted communication resource; and the allocation circuit is further configured to allocate the second boosted communication resource to the second node to configure the second node to download data using the second boosted communication resource during the second boost time of the second time period.

In some exemplary embodiments, a total load of the second node relative to a common link communication resource summed with a product of the average communication resource and the number of the plurality of first nodes is less than the common link communication resource.

In some exemplary embodiments, the allocation circuit is further configured to allocate a communication resource to each of the plurality of first nodes and allocating the boosted communication resource to the second node according to a Multi-TimeScale Throughput Value Function (MTS-TVF) comprising a TVF for each of two or more different timescales. In some exemplary embodiments, each of the TVFs of the MTS-TVF further comprise a different TVF for each of one or more service classes. In some exemplary embodiments, the allocation circuit allocates the communication resource to each of the plurality of first nodes by allocating the communication resource to each of the plurality of first nodes responsive to one or more quality of experience requirements.

In some exemplary embodiments, the core network node comprises a gateway node.

In some exemplary embodiments, the plurality of first nodes and the second node each comprise different communication devices in the communication network.

DETAILED DESCRIPTION

A Service Level Agreement (SLA) is "the contract between the Subscriber and Service Provider specifying the agreed to service level commitments and related business agreements." See, e.g., Metro Ethernet Forum (MEF) 10.2: Ethernet Services Attributes Phase 2, 27 Oct. 2009 (https://www.mef.net/Assets/Technical_Specifications/PDF/MEF_10.2.pdf). For example, the SLAs standardized by MEF are highly successful and used for Ethernet Leased Lines. MEF 10.2 describes a very simple SLA. "Bandwidth Profile for Multi-Timescale Fairness," WCNC 2020 (see Appendix A), extends MEF 10.2 by providing a dimensioning method for MTS behavior, but that extension only works if the traffic mix and the system capacity is exactly as configured in the dimensioning inputs. Deviation from this input highly degrades the precision of the MTS resource sharing control. "Towards Core-Stateless Fairness on Multiple Timescales," by S. Nadas and G. Gmbos, ANRW, 19 Jul. 2019 (see Appendix B), extends MEF 10.2 to more granular behavior on multiple timescales by introducing a new resource sharing method, which takes into account traffic history on multiple timescales. While this more granular solution demonstrates multi-timescale fairness, it does not describe how to design the Multi-TimeScale Throughput Value Function (MTS-TVF) to meet certain goals, e.g., boosting traffic for a specified amount of time, allowing downloads of a given amount of data faster for newly arrived flows, etc.

There are, and there always will be, bursty traffic sources. For example, as the peak air interface capacity increases in cellular networks, the backhaul can be more and more a potential bottleneck. The peak air interface throughput cannot always be reached as it requires good conditions over the air. In a typical case, often a much smaller cell throughput is feasible.

Communication networks have not fully developed the idea of fairness among traffic aggregates; flows with a long traffic history often get the same resource share as a new flow with little to no traffic history. The solution presented herein addresses this problem by boosting the share of resources allocated to new flows to produce a better overall QoE.

Figure 1:
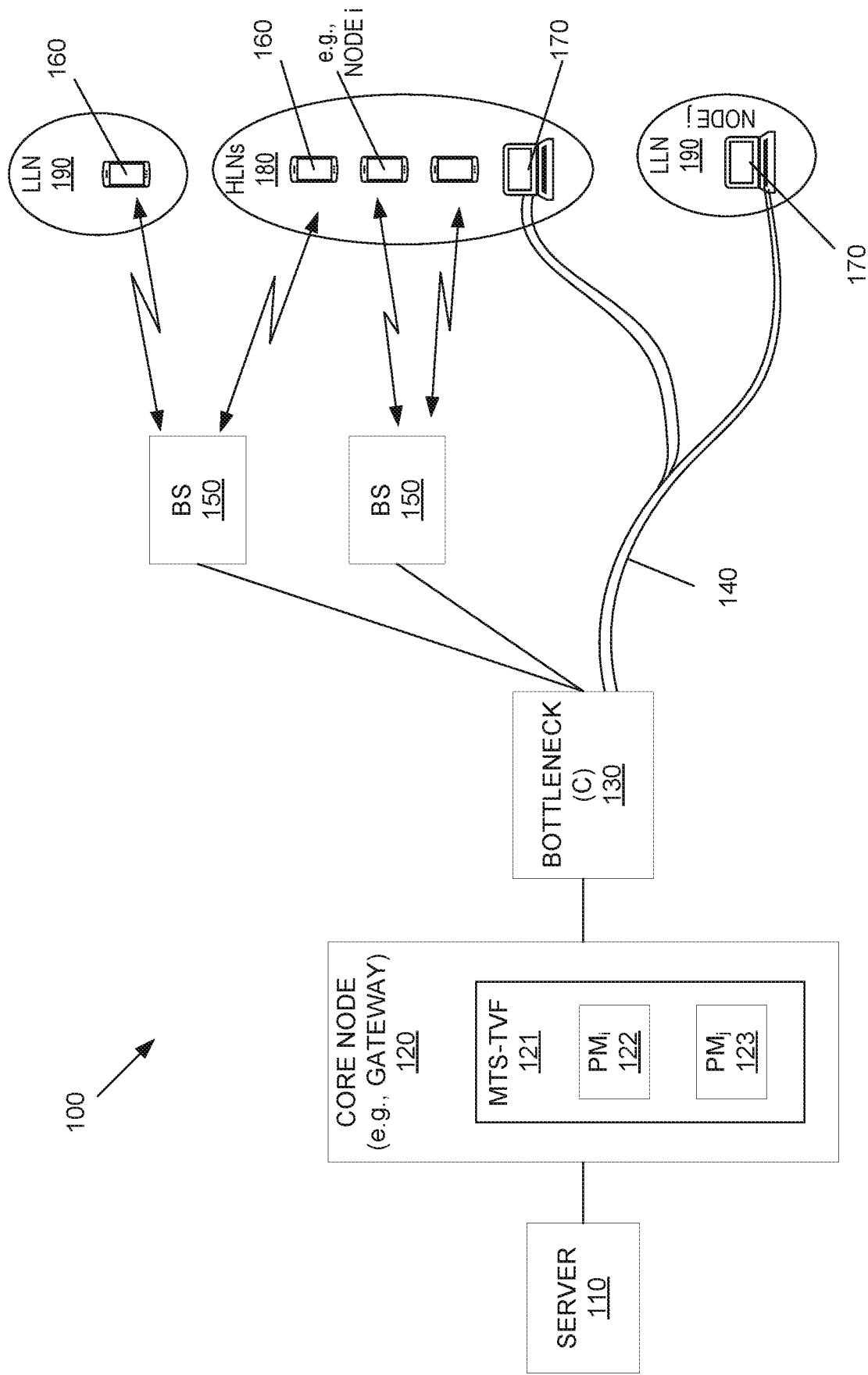
FIG. 1 shows a communication network according to one exemplary embodiment.

FIG. 1 shows an exemplary communication network 100 allocating resources for traffic flows associated with wireless and wired devices 160, 170. Communication network 100 comprises a server 110, a core network node 120, e.g., a gateway node, bottleneck 130, cables 140, base stations 150, wireless devices 160, and wired devices 170. The core network node 120 receives data from server 110, and conveys such data to the appropriate wireless device 160 via a base station 150 and/or to the appropriate wired device 170 via a cable 140. All devices 160, 170 in the communication network 100 access the gateway 120 via the bottleneck 130, which represents the bottleneck caused by backhauls in a communication network, and which defines the availability of a shared resource, e.g., bandwidth, for the wired and wireless devices 160, 170. As detailed further below, exemplary wireless devices 160 include any remote device that communicates within the communication network 100 via a wireless link (e.g., a cellular link, WiFi, etc.), while exemplary wired devices 170 include any remote device that communicates within the communication network 100 via a wired link (e.g., an electric cable, fiberoptic cable, etc.). While FIG. 1 shows a wireless device 160 as a smart phone and a wired device 170 as a computer terminal, it will be appreciated that these are exemplary and non-limiting.

The solution presented herein groups devices 160, 170 according to traffic flow, where devices 160, 170 consistently requiring communication resources are grouped as High Load Nodes (HLNs) 180, and devices 160, 170 intermittently requiring communication resources are grouped as Low Load Nodes (LLNs) 190. As used herein, an HLN 180 is any device 160, 170 that has a traffic history that consistently utilizes network resources over a specified period of time, which may also be referred to herein as a "bad" node and/or a node having a "bad" traffic history. As used herein, a LLN 190 is any device 160, 170 that, when active, has a traffic history over a specified period of time that inconsistently and/or briefly utilizes network resources over that specified period of time, e.g., a newly active device, which may also be referred to herein as a "good" node and/or as a node having a "good" traffic history during at least an initial part of a download. It will be appreciated that the number of active LLN(s) 190 in the communication network 100 is generally different (i.e., less) than the number of LLNs 190 that exist in the communication network 100.

Communication networks typically share resources, e.g., bandwidth, according to a fairness assessment based on throughput. Throughput, however, looks different for different time scales. For most current resource sharing control methods, throughput is measured for a short timescale, e.g., for round trip time (RTT). The measured throughput, however has different values for different timescales (e.g., RTT, 1 sec, 10 sec, session duration, etc.) due to the fact that the number of active vs. inactive devices may be different for different time periods. Current networks typically apply the same resource sharing to traffic flows with a long traffic history as they do to a new traffic flow with little to no traffic history. This results in unfair resource sharing, at least from a Quality of Experience (QoE) perspective of the user. The solution presented herein solves this problem by implementing fair resource sharing that takes into account the traffic history of each node 160, 170 currently sharing resources. In particular, the solution presented herein boosts the resources allocated to a new traffic flow (e.g., a newly active LLN 190), at least initially, relative to the average resources allocated to existing traffic flows (e.g., HLNs 180), while still staying within system capacity limits.

Figure 2:
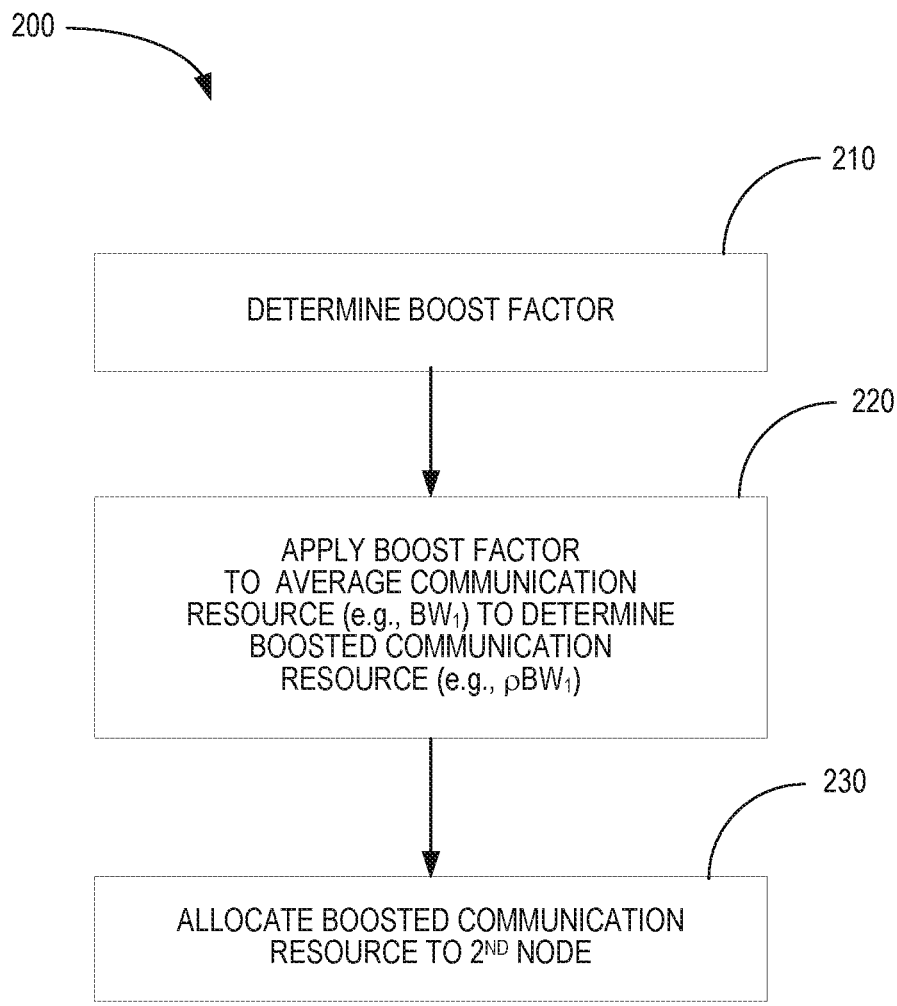
FIG. 2 shows a resource sharing method according to one exemplary embodiment.

FIG. 2 shows an exemplary method 200 of adjusting resource allocation to provide multi-timescale fairness for a communication network 100 comprising a plurality of first nodes 180 (e.g., HLNs 180), each consistently requiring an average throughput resource, e.g., bandwidth ($BW_1$), over a first time period ($t_1$), and a second node 190 (e.g., a newly active LLN 190) intermittently requiring communication resources during the first time period. The method 200 is implemented by the core network node 120 and comprises determining (block 210) a boost factor ($\rho$) responsive to the average throughput resource ($BW_1$) and a planned data size (FS) for download by the second node 190 during an initial boost time ($\Delta t_{init}$) of a second time period ($t_2$) within the first time period ($t_1$). The method 200 further comprises applying (block 220) the boost factor (ρ) to the average throughput resource ($BW_1$) to determine a boosted throughput resource ($\rho BW_1$). The method 200 further comprises allocating (block 230) the boosted throughput resource ($\rho BW_1$) to the second node 190 to configure the second node 190 to download data using the boosted throughput resource ($\rho BW_1$) during the initial boost time ($\Delta t_{init}$) of the second time period ($t_2$).

Figure 3:
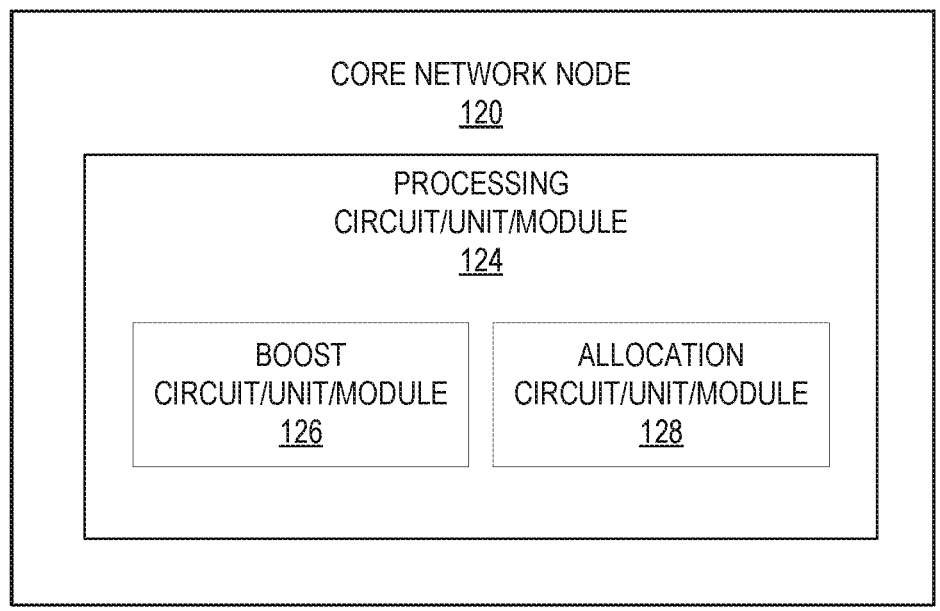
FIG. 3 shows a core network node according to one exemplary embodiment.

FIG. 3 shows an exemplary core network node 120 configure to implement method 200 according to the solution presented herein. In one exemplary embodiment, one or more processing circuits 124 execute the method 200 of FIG. 2. In another exemplary embodiment, a boost circuit 126 is configured to determine a boost factor (ρ) responsive to the average throughput resource ($BW_1$) and a planned data size (FS) for download by the second node 190 during an initial boost time ($\Delta t_{init}$) of a second time period ($t_2$) within the first time period ($t_1$), and to apply the boost factor (ρ) to the average throughput resource ($BW_1$) to determine a boosted throughput resource ($\rho BW_1$). Allocation circuit 128 is configured to allocate the boosted throughput resource ($\rho BW_1$) to the second node 190 to configure the second node 190 to download data using the boosted throughput resource during the initial boost time ($\Delta t_{init}$) of the second time period ($t_2$).

Figure 8:
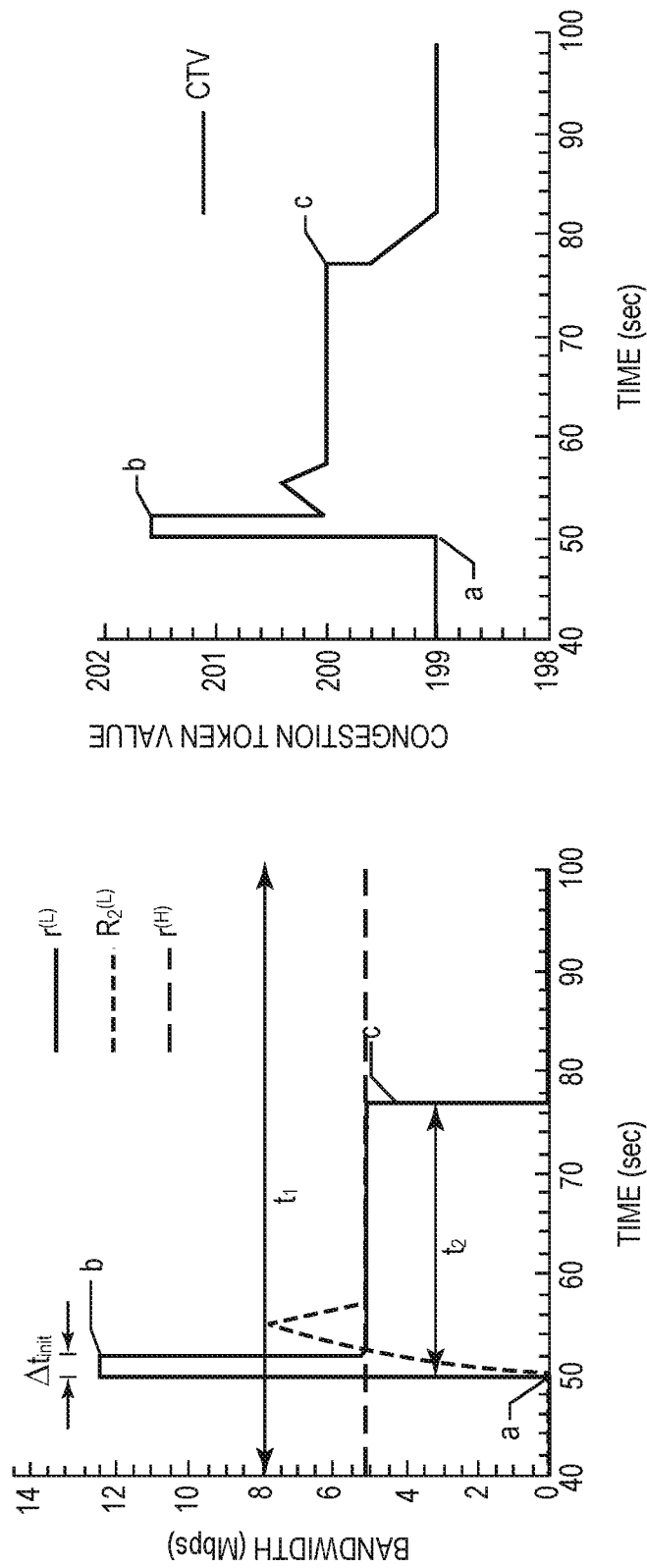
FIG. 8 shows exemplary bandwidth allocation and a corresponding CTV according to one exemplary embodiment.
Figure 9:
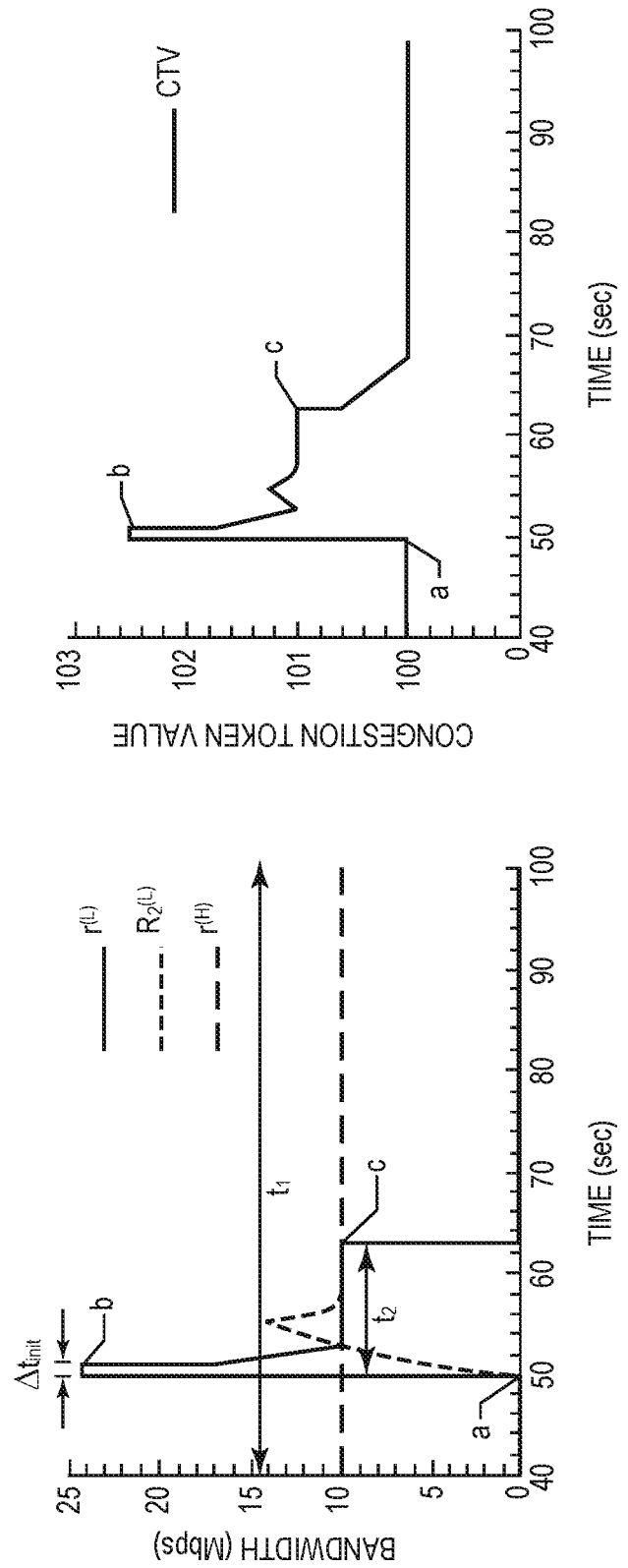
FIG. 9 shows exemplary bandwidth allocation and a corresponding CTV according to one exemplary embodiment.

In some exemplary embodiments, the core network node 120 allocates the average throughput resource ($BW_1$) to the second node 190 to configure the second node 190 to download the rest of the data using the average throughput resource ($BW_1$) during the remainder of the second time period ($t_2$) (i.e., after expiration of the initial boost time ($\Delta t_{init}$)), e.g., as shown in FIGS. 8 and 9. After expiration of the initial boost time, and once the LLN 190 is allocated the average throughput resource, the LLN 190 becomes a "bad" node, i.e., a node with a "bad" history, i.e., an "HLN."

Figure 10:
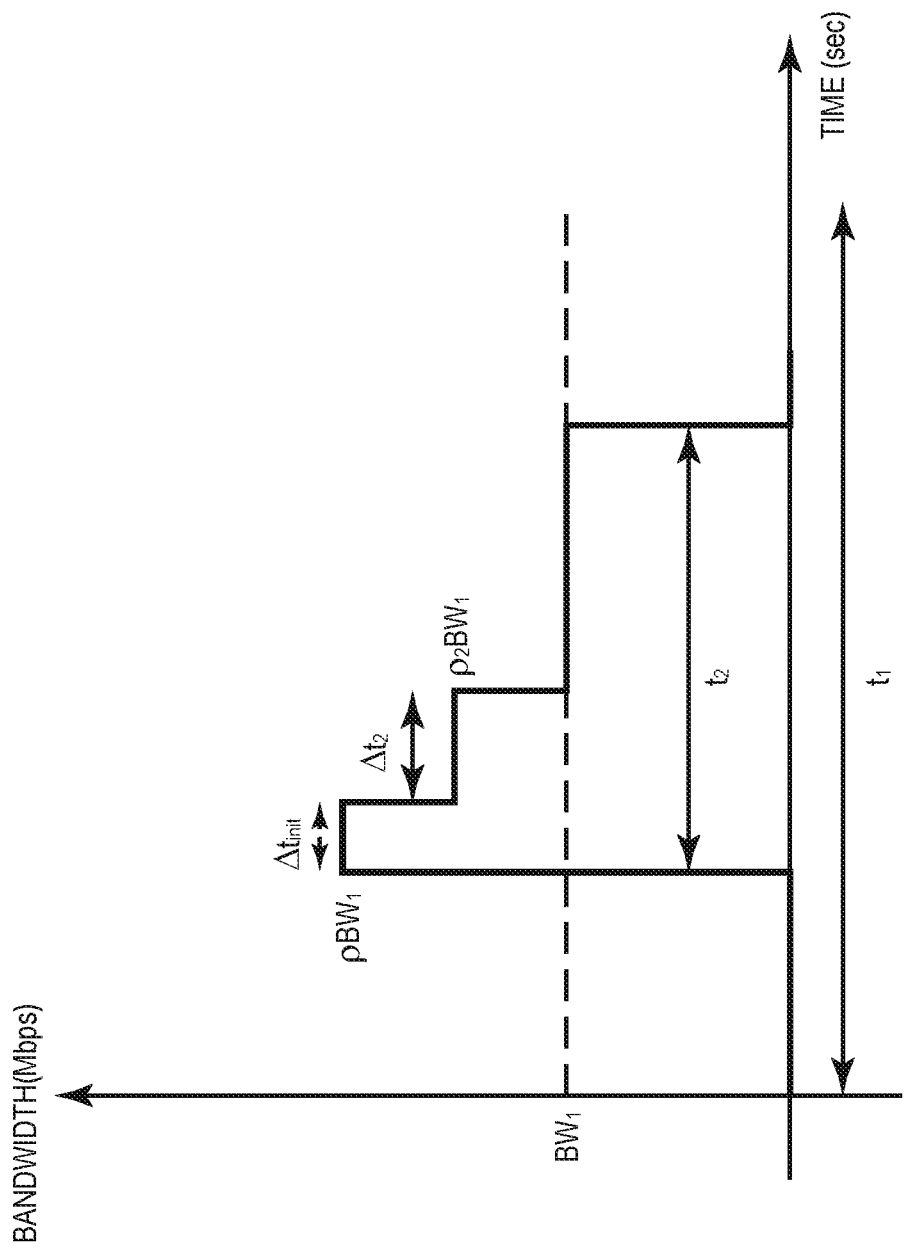
FIG. 10 shows exemplary bandwidth allocation according to one exemplary embodiment.

In some exemplary embodiments, the core network node 120 may determine multiple boost factors for multiple boost times, e.g., as shown in FIG. 10. In this example, the core network node 120 determines a new, i.e., second, boost factor ($\rho_2$) for a second boost time ($\Delta t_2$) of the second time period ($t_2$) after expiration of the initial boost time ($\Delta t_{init}$) responsive to the average throughput resource ($BW_1$) and a second planned data size ($FS_2$) for download by the second node 190 during the second boost time ($\Delta t_2$). After applying the second boost factor ($\rho_2$) to the average throughput resource ($BW_1$) to determine a second boosted throughput resource ($\rho_2 BW_1$), the core network node 120 allocates the second boosted throughput resource ($\rho_2 BW_1$) to the second node 190 to configure the second node 190 to download data using the second boosted throughput resource ($\rho_2 BW_1$) during the second boost time ($\Delta t_2$) of the second time period ($t_2$).

While the above generally describes the solution presented herein, the following first provides background information regarding MTS-TVF, and then provides details for exemplary embodiments, as well as details proving the effectiveness for the solution presented herein.

Figure 4:
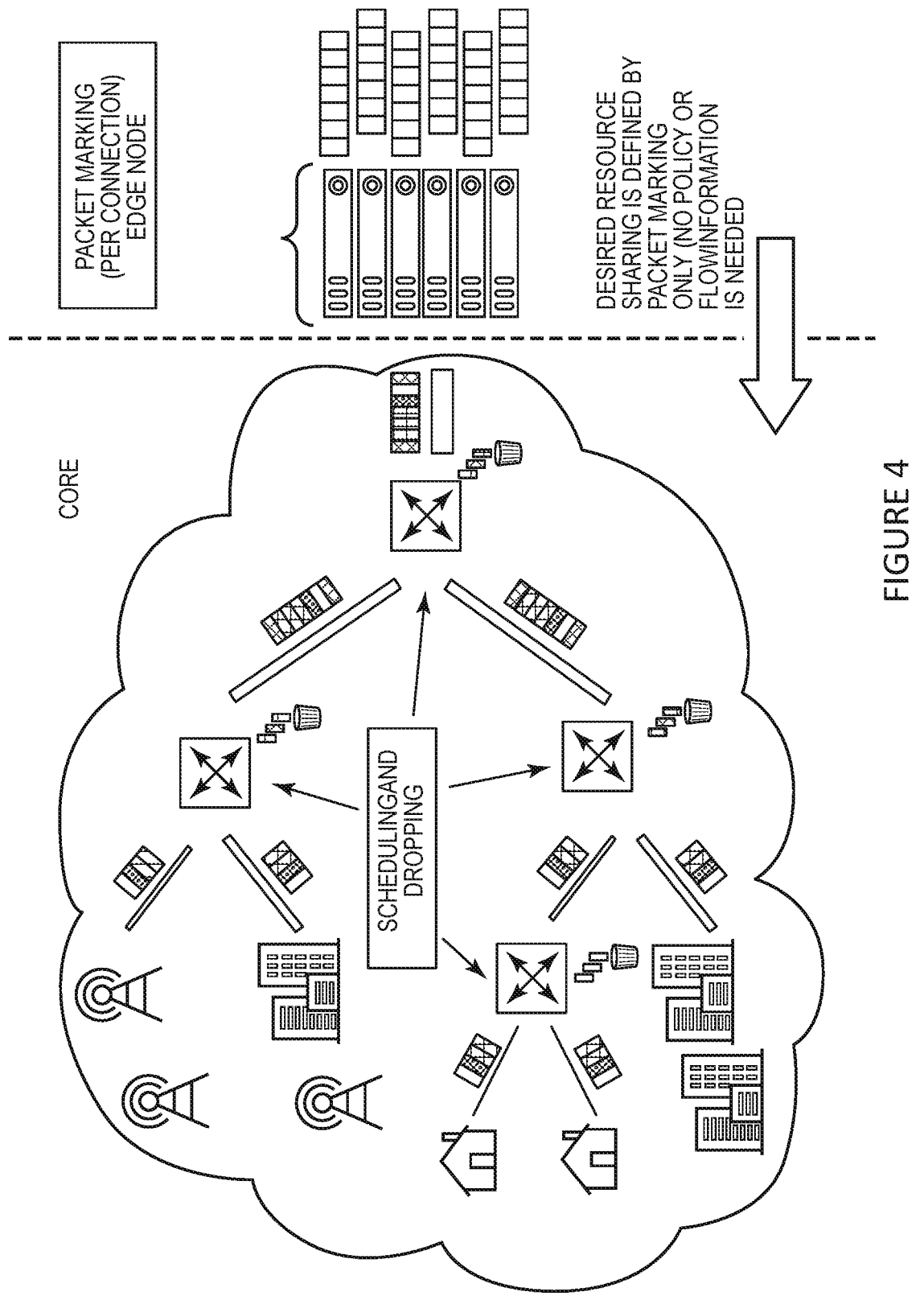
FIG. 4 shows packet marking as implemented by a core network node according to one exemplary embodiment.

TVF resource sharing includes the core network node 120 marking each packet with a continuous value called the Packet Value (PV). The goal of this Per Packet Value (PPV) marking is to maximize the total aggregate PV of the delivered packets. There are two phases for the resource sharing procedure: (1) packet marking at the network edge and (2) packet scheduling and dropping based on the PV in the middle of the network. FIG. 4 shows exemplary packet marking at the network edge, which corresponds to the packet marking shown in FIG. 1. As shown in FIG. 1, there is a separate packet marker (PM) entity for each device 160, 170, e.g., $PM_i$ 122, $PM_j$ 123, etc. These PM entities are identical in configuration, but are not identical in state. For example, the core network node 120 may comprise an MTS-TVF circuit 121 that determines each PM entity, where each PM determines a CTVF based on throughput measurements on several timescales. Based on the throughput measurement for the lowest timescale, a random number, and the CTVF, the PM entity determines a PV for each packet. While the configuration for LLNs and HLNs might be the same, the throughput measurement is different. Therefore, the CTVFs of the LLNs and HLNs is often different, which results in different packet marking. The resulting PPV, together with "Scheduling and Dropping," will realize the desired resource sharing.

Figure 5:
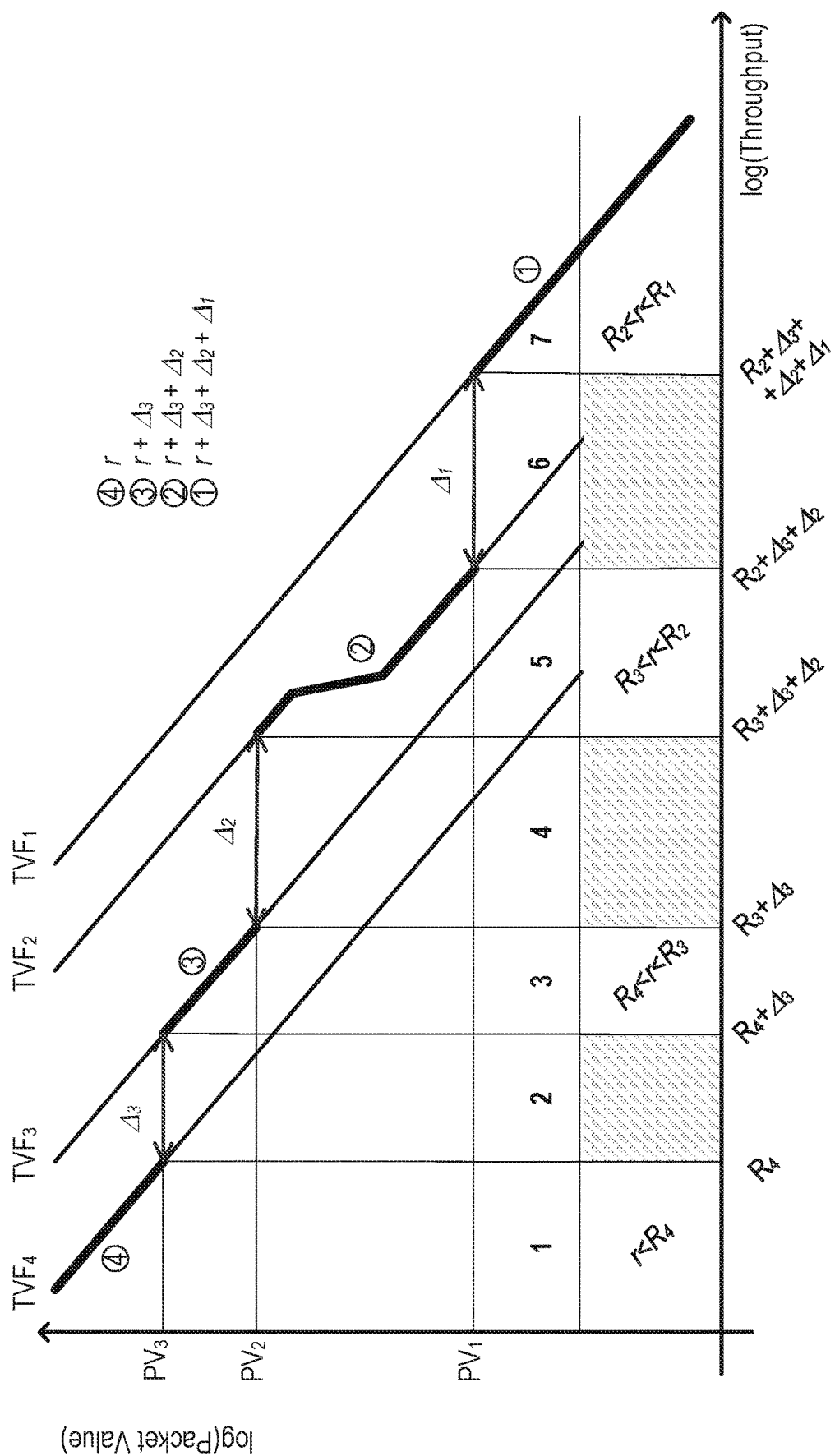
FIG. 5 shows an example of four TVFs for four different timescales.
Figure 6:
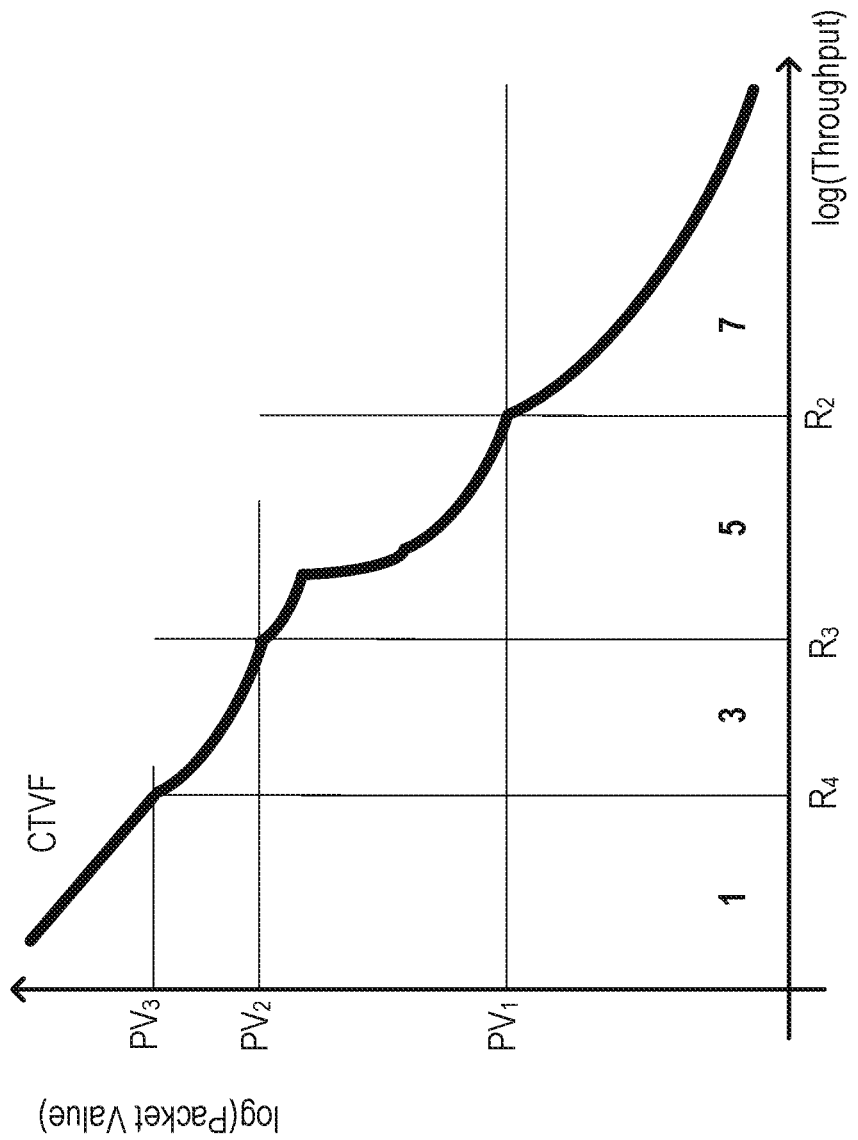
FIG. 6 shows the composite TVF for the example of FIG. 5.

MTS-TVF aims to control resource sharing between nodes having different rates and different timescales. Thus, instead of having a single TVF for all timescales, MTS-TVF defines a different TVF for each timescale. FIG. 5 shows the packet value for an example having four different timescales, where the actual packet value of the packet is derived from the four TVFs (each associated with a different one of the four timescales. FIG. 6 shows the composite TVF derived from FIG. 5, where additional details associated with this exemplary composite TVF may be found in Appendix C.

In general, bitrates are measured on a short timescale, e.g., RTT. As such typical bandwidth profiling expresses the instantaneous resource usage, and may capture short bursts. To implement long-term fairness, however, longer timescales are used, where there may be multiple timescales $TS_1$, $TS_2$, . . . , $TS_n$ with different lengths, e.g., $TS_1 < TS_2 < \ldots < TS_n$, where $TS_1$ is RTT, for example. For example, a set of four timescales may include RTT, 1 sec, 10 sec, and a typical session duration. After the longest time period, e.g., the typical session duration, has elapsed, it is expected that all rate measurements for an equally paced and stable traffic flow will be the same, i.e., $R_i \approx R$, $\forall TS_i$, where $R_i$ represents the measured rate for timescale $TS_i$. As such, all HLNs 180 are typically allocated the same average bandwidth, e.g., $BW_1$, for all timescales. LLNs 190, however, are not active the entire time, and thus are generally associated with more transient situations. In this case, the measured rate for the short timescale, e.g., $R_1$, for the LLN traffic flows may be high. As such, rate measurements for shorter timescales react faster to changing network conditions. Thus, the TVFs for shorter timescales may be adapted to better accommodate any newly active nodes.

In other words, the solution presented herein assumes the HLNs 180 and the LLN(s) 190 (when active) compete for the allocated throughput resource(s), e.g., bandwidth, of a common link (C), where a number ($N_H$) of HLNs 180 are constantly active, resulting in an overloaded network scenario and the same traffic history with relatively high measured bandwidth on the longest timescale for all HLNs 180. The load of any single LLN 190 is therefore low enough that a newly active LLN has negligible measured bandwidth on this longest timescale.

The solution presented herein has multiple goals, referred to herein as dimensioning goals, which may be defined using the following parameters:

$N_H$: number of active HLNs
$BW_1$: average bandwidth for the HLNs 180 during a specified time period
C: total bandwidth of the bottleneck 130
$l_L$: total load of LLNs relative to C
ρ: boost factor for LLN FS: initial buffer size for planned download $\Delta t_{init}$: time to download/access FS, which is within the specified time period of $BW_1$.

The dimensioning goals may be defined as follows:

Provide at least $BW_1$ for each HLN 180 in the specified time period (e.g., a long time period), where it is assumed $N_H BW_1 + l_L C < C$.

Allocate $\rho BW_1$ to a newly active LLN 190, where this allocated bandwidth should be high enough so that the LLN 190 is able to download FS in time $\Delta t_{init}$.

Set $\rho$ to the lowest value satisfying the second dimensioning goal so as to avoid extreme bandwidth fluctuations.

Figure 7:
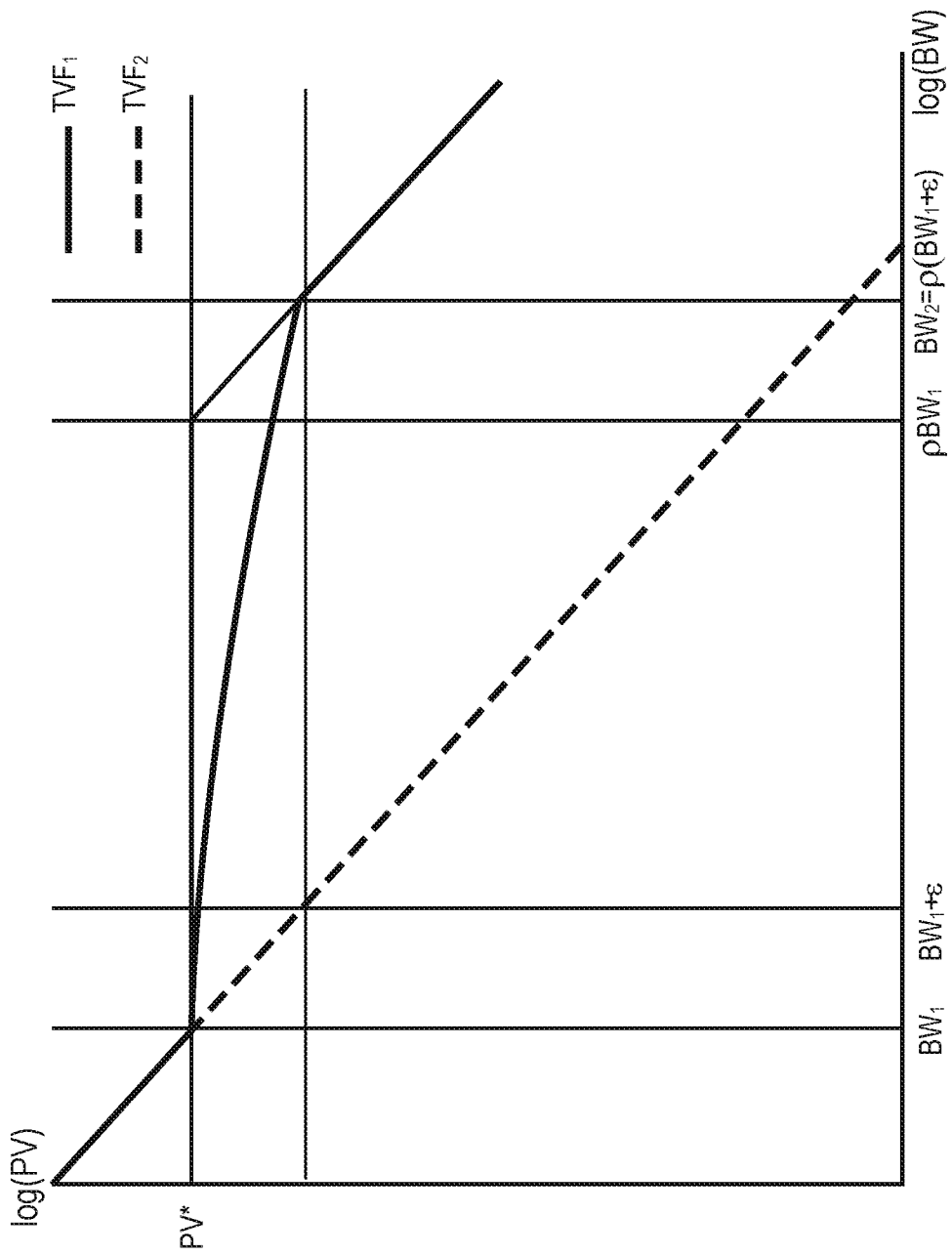
FIG. 7 shows an exemplary TVF according to the solution presented herein.

The following TVFs may be defined to satisfy these dimensioning goals.

$$TVF_1(x) = \begin{cases} 1/x, & \text{if } x < BW_1 \\ \frac{(BW_2 - x)}{(BW_2 - BW_1)BW_1} + \frac{\rho(x - BW_1)}{(BW_2 - BW_1)\rho BW_1}, & \text{if } BW_1 \leq x \leq BW_2 \\ \rho/x, & \text{otherwise} \end{cases}$$

$$TVF_2(x) = 1/x$$

where $BW_1$ is set such that $TVF_1(x)$ is strictly monotone decreasing (i.e., invertible) in the $(BW_1, BW_2)$ interval. In other words, $BW_2 = \rho BW + \epsilon$ with a small positive $\epsilon$ ($0 < \epsilon \ll BW_1$) and $TVF_1(x)$ is linear between $BW_1$ and $BW_2$, as shown in FIG. 7. For this example, the first timescale $TS_1$ belonging to $TVF_1(x)$ is RTT, while the second timescale $TS_2$ belonging to $TVF_2(x)$ is $TS_2 = FS/BW_1$, and $\rho = FS/(\Delta t_{init} BW_1)$. For $x < BW_1$, $TVF_1(x) = TVF_2(x)$. Consequently, for any node with $R_2 \leq BW_1$ (where $R_2$ represents the bandwidth for $TS_2$), the resulting equivalent single timescale TVF equals $TVF_1(x)$. For similar reasons, for nodes with a long transmission history (e.g., HLNs 180 where $R_2 > BW_1$) the resulting single timescale TVF equals $TVF_2(x)$. For this reason, the throughput ratio between the LLN 190 and the HLNs 180 will be $\rho$, as desired, and the setting of $TS_2$ and $\rho$ as indicated herein will result in the bandwidth boost during $\Delta t_{init}$, as desired. As such, the solution presented herein allocates the throughput resource to the HLNs 180 and the boosted throughput resource to the LLN 190 according to a MTS-TVF comprising a different TVF for each of two timescales.

FIG. 8 shows the throughput (left) of a LLN 190 and a plurality of HLNs 180 when the number of HLNs 180 is as specified for the first dimensioning goal, e.g., $N_H = 199$, as well as the corresponding congestion threshold value (CTV) (right). In this example, the LLN 190 starts transmission when 199 HLNs are present in the system with C=1 Gbps, where $\rho = 2.5$ for $\Delta t_{init} = 2$ sec, which is long enough to download FS. FIG. 9 shows the throughput (left) of a LLN 190 and a plurality of HLNs 180 when the number of HLNs is less than that specified for the first dimensioning goal, e.g., $N_H = 100$, as well as the corresponding CTV (right). In this example, $\rho$ is still 2.5, but $\Delta t_{init}$ is shorter, i.e., 1 sec, which is still long enough to download FS. Both of the examples of FIGS. 8 and 9 reflect a system, where for HLNs 180 we have a baseline requirement that each HLN 180 is allocated at least a baseline bandwidth as a long term average (e.g., $BW_1 = 5$ Mbps in FIG. 8 and $BW_1 = 10$ Mbps in FIG. 9), which satisfies a requirement to download one video flow every 30 seconds. It will be appreciated that for exemplary video flows, FS=3.125 MB of total size to be downloaded in $\Delta t_{init} = 2$ sec, where the entire video flow is downloaded in 2 seconds (i.e., $t_2 = 2$ sec).

In FIG. 8, a video flow arrives at 50 seconds for an LLN 190 (i.e., a node with a "good" history), while otherwise the system has 199 active HLNs 180 (i.e., nodes with a "bad" history). This system is critical in the sense that the average baseline bandwidth of $BW_1 = 5$ Mbps cannot be met when the total node count is above 200 active nodes. The TVF dimensioning of the solution presented herein is designed exactly for this setup: the single LLN 190 has bandwidth $2.5*BW_1 = 12.5$ Mbps until the initial buffer size is reached (i.e., until $\Delta t_{init} = 2$ sec has expired). After expiration of $\Delta t_{init}$, the history of the LLN 190 reverts to "bad" and its bandwidth drops to $BW_1 = 5$ Mbps until the video is finished. FIG. 8 displays the bandwidth of the single LLN 180 (i.e., $r^{(L)}$ in FIG. 8), the bandwidth of a node with bad history (i.e., $r^{(H)}$ in FIG. 8), the bitrate history of the LLN 190 at the long timescale (5 s), and the CTV. The LLN BW, even with boosting, is in complete accordance with the dimensioning goals.

In FIG. 9, everything is the same as FIG. 8, except the system has only 100 HLNs 180. Due to the lower number of HLNs 180, the HLNs 180 are allocated a higher baseline average bandwidth (e.g., $BW_1 = 10$ Mbps, which is twice the BW allocated in FIG. 8). Due to the multiplicative dimensioning of the TVF, the single LLN 190 gets $BW_2 = 25$ Mbps until the initial buffer is reached, which now takes less than 2 seconds, resulting in the total download time also taking much less than the 30 seconds previously required. This realization is acceptable, however, because the system is subcritical (e.g., $N_H < 199$), so every HLN 180 gets higher bandwidth than is allocated for the critical example of FIG. 8.

FIGS. 8 and 9 therefore show that for a dynamic system, as long as the first dimensioning goal is met (i.e., the number of HLNs 180 is below the critical state of the network), the second and third dimensioning goals will be met by the proposed MTS-TVF.

In summary, the solution presented herein may generally be described according to the following:

Configure the MTS-TVF responsive to baseline parameters, e.g., a boost factor ($\rho$), an initial boost time ($\Delta t_{init}$), and a baseline average throughput resource, e.g., bandwidth, for the HLNs ($BW_1$)

Baseline parameters are determined based on a working point of the system, e.g., the congestion threshold value.

Baseline parameters may also be influenced by QoE requirements.

The behavior resulting from the solution presented herein is realized in the critical system (i.e., when the limit of the first dimensioning goal is realized), the QoE requirements are met when the load is below that of the critical system.

The MTS-TVF produced by the solution presented herein is used as a net neutral description of desired fairness on multiple timescales.

The solution presented herein has the following advantages:

Controls resource sharing for all traffic mixes;

Maintains the desired multi-timescale behavior for a wide range of traffic mixes;

Provides a basis to define and discuss granular multi-timescale fairness;

Can be extended to more requirements at the same time, e.g., QoE;

A single MTS-TVF is applicable for heavy and light users, without any feedback; Extends the advantages of PPV to MTS, where several service classes may be defined, e.g., gold class users may be boosted more (e.g., 5 times more) and/or gold heavy users may experience higher (e.g., 10 Mbps);

is Provides a net-neutral way to improve QoE.

As discussed above, the HLNs and LLNs may be wireless or wired devices. As used herein, a wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As used herein, the term wired device represents any communication device that connects to the communication network via a wired connection, e.g., electric cable, fiber optic cable, etc. Exemplary wired devices include, but are not limited to desktop computers, laptop computers, cloud-based devices, virtual assistant devices, etc.

Various elements disclosed herein are described as some kind of circuit, e.g., a processing circuit, a boost circuit, an allocation circuit, etc. Each of these circuits may be embodied in hardware and/or in software (including firmware, resident software, microcode, etc.) executed on a controller or processor, including an application specific integrated circuit (ASIC), function-specific unit, and/or function-specific module.

The present invention may be embodied as cellular communication systems, methods, and/or computer program products. Accordingly, the present invention may be embodied in hardware and/or in software (including firmware, resident software, micro-code, etc.), including an application specific integrated circuit (ASIC). Furthermore, the present invention may take the form of a computer program product on a computer-usable or computer-readable storage medium having computer usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, or a portable compact disc read-only memory (CD-ROM). Note that the computer-usable or computer-readable medium could even be paper or another suitable medium upon which the program is printed, as the program can be electronically captured via, for example, optical scanning or the paper or other medium, then compiled, interpreted, or otherwise processed in a suitable manner, if necessary, and then stored in a computer memory.

While the above describes the solution presented herein in terms of a throughput resource, e.g., allocated bandwidth, it will be appreciated that the solution presented herein may be applied to other communication resources, including but not limited to, CPU and/or memory usage during packet processing.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of adjusting resource allocation to provide multi-timescale fairness for a communication network at a bottleneck defining shared resource availability for a plurality of first nodes and a second node, the method implemented by a core network node and comprising:

determining a boost factor responsive to an average communication resource and a planned data size for download by the second node during an initial boost time of a second time period within a first time period, wherein the average communication resource is required by each of the first nodes over the first time period and the second node intermittently requires communication resources during the first time period;

applying the boost factor to the average communication resource to determine a boosted communication resource; and allocating the boosted communication resource to the second node to configure the second node to download data using the boosted communication resource during the initial boost time of the second time period.

2. The method of claim 1, wherein the average communication resource comprises a bandwidth.

3. The method of claim 1, further comprising allocating the average communication resource to the second node to configure the second node to download data using the average communication resource during a remainder of the second time period after expiration of the initial boost time.

4. The method of claim 1, further comprising:
determining a second boost factor for a second boost time of the second time period after expiration of the initial boost time responsive to the average communication resource and a second planned data size for download by the second node during the second boost time;

applying the second boost factor to the average communication resource to determine a second boosted communication resource; and allocating the second boosted communication resource to the second node to configure the second node to download data using the second boosted communication resource during the second boost time of the second time period.

5. The method of claim 1, wherein a total load of the second node relative to a common link communication resource summed with a product of the average communication resource and the number of the plurality of first nodes is less than the common link communication resource.

6. The method of claim 1, further comprising allocating a communication resource to each of the plurality of first nodes and allocating the boosted communication resource to the second node according to a Multi-TimeScale Throughput Value Function (MTS-TVF) comprising a TVF for each of two or more different timescales.

7. The method of claim 6, wherein each of the TVFs of the MTS-TVF further comprise a different TVF for each of one or more service classes.

8. The method of claim 6, wherein the allocating the communication resource to each of the plurality of first nodes comprises allocating the communication resource to each of the plurality of first nodes responsive to one or more quality of experience requirements.

9. The method of claim 1, wherein the core network node comprises a gateway node.

10. A core network node configured to adjust resource allocation for a plurality of first nodes and provide multi-timescale fairness for a communication network at a bottleneck defining shared resource availability for the plurality of first nodes and a second node, the core network node comprising:
processing circuitry; and
memory storing instructions executable by the processing circuitry whereby the core network node is configured to:
determine a boost factor responsive to an average communication resource and a planned data size for download by the second node during an initial boost time of a second time period within a first time period, wherein the average communication resource is required by each of the first nodes over the first time period and the second node intermittently requires communication resources during the first time period; and apply the boost factor to the average communication resource to determine a boosted communication resource; and allocate the boosted communication resource to the second node to configure the second node to download data using the boosted communication resource during the initial boost time of the second time period.

11. The core network node of claim 10, wherein the average communication resource comprises a bandwidth.

12. The core network node of claim 10, wherein the core network node is further configured to allocate the average communication resource to the second node to configure the second node to download data using the average communication resource during a remainder of the second time period after expiration of the initial boost time.

13. The core network node of claim 10, wherein the core network node is further configured to:
determine a second boost factor for a second boost time of the second time period after expiration of the initial boost time responsive to the average communication resource and a second planned data size for download by the second node during the second boost time; and
apply the second boost factor to the average communication resource to determine a second boosted communication resource; and
allocate the second boosted communication resource to the second node to configure the second node to download data using the second boosted communication resource during the second boost time of the second time period.

14. The core network node of claim 10, wherein a total load of the second node relative to a common link communication resource summed with a product of the average communication resource and the number of the plurality of first nodes is less than the common link communication resource.

15. The core network node of claim 10, wherein the core network node is further configured to allocate a communication resource to each of the plurality of first nodes and allocating the boosted communication resource to the second node according to a Multi-TimeScale Throughput Value Function (MTS-TVF) comprising a TVF for each of two or more different timescales.

16. The core network node of claim 15, wherein each of the TVFs of the MTS-TVF further comprise a different TVF for each of one or more service classes.

17. The core network node of claim 15, wherein the core network node allocates the communication resource to each of the plurality of first nodes by allocating the communication resource to each of the plurality of first nodes responsive to one or more quality of experience requirements.

18. The core network node of claim 10, wherein the core network node comprises a gateway node.

19. The core network node of claim 10, wherein the plurality of first nodes and the second node each comprise different communication devices in the communication network.

20. A non-transitory computer readable medium storing a computer program product for controlling a core network node to provide multi-timescale fairness for a communication network at a bottleneck defining shared resource availability for a plurality of first nodes and a second node, the computer program product comprising software instructions that, when run on the core network node, cause the core network node to:
- determine a boost factor responsive to an average communication resource and a planned data size for download by the second node during an initial boost time of a second time period within a first time period, wherein the average communication resource is required by each of the first nodes over the first time period and the second node intermittently requires communication resources during the first time period;
- apply the boost factor to the average communication resource to determine a boosted communication resource; and
- allocate the boosted communication resource to the second node to configure the second node to download data using the boosted communication resource during the initial boost time of the second time period.

* * * * *